United States Patent
Nieto et al.

(10) Patent No.: US 7,627,803 B2
(45) Date of Patent: Dec. 1, 2009

(54) SYSTEM AND METHOD FOR VARIABLE FORWARD ERROR CORRECTION (FEC) PROTECTION

(75) Inventors: John W. Nieto, Rochester, NY (US); William N. Furman, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 658 days.

(21) Appl. No.: 11/428,689

(22) Filed: Jul. 5, 2006

(65) Prior Publication Data

US 2008/0010582 A1 Jan. 10, 2008

(51) Int. Cl.
*H03M 13/00* (2006.01)
(52) U.S. Cl. ..................................... 714/776
(58) Field of Classification Search ......... 714/751–752, 714/776, 786, 790
See application file for complete search history.

(56) References Cited

U.S. PATENT DOCUMENTS

| | | | | |
|---|---|---|---|---|
| 4,462,101 A | 7/1984 | Yasuda et al. | ................ | 714/794 |
| 5,668,820 A | 9/1997 | Ramesh et al. | ............... | 714/786 |
| 6,397,367 B1 * | 5/2002 | Park et al. | .................... | 714/786 |
| 6,671,851 B1 * | 12/2003 | Moulsley | ..................... | 714/790 |
| 6,781,446 B2 | 8/2004 | Furman et al. | ............... | 329/304 |
| 7,016,650 B2 | 3/2006 | Furman et al. | ................ | 455/65 |
| 7,249,303 B2 | 7/2007 | Dottling et al. | ................ | 710/62 |
| 7,523,382 B2 * | 4/2009 | Kim et al. | ..................... | 714/776 |
| 7,526,022 B2 | 4/2009 | Nieto | ........................... | 375/233 |
| 2002/0071407 A1 | 6/2002 | Koo et al. | ..................... | 370/335 |
| 2005/0276345 A1 | 12/2005 | Norris et al. | ................. | 375/265 |
| 2006/0098753 A1 | 5/2006 | Norris et al. | ................. | 375/265 |
| 2006/0109919 A1 | 5/2006 | Nieto | ........................... | 375/260 |
| 2006/0114968 A1 | 6/2006 | Nieto et al. | .................. | 375/130 |

FOREIGN PATENT DOCUMENTS

EP 0 794 631 9/1997

OTHER PUBLICATIONS

Yuming et al., Implementation Architecture of a variable forward error correction decoder, 1998, IEEE, p. 2840 to 2847.*
Miller et al., "*A High Performance Waveform for Military Ka-Band Satellite Communications*," Military Communications Conference, Oct. 31, 2004, pp. 1220-1225.
Yasuda et al., "*High-Rate Punctured Convolutional Codes for Soft Decision Viterbi Decoding*," IEEE Transactions on Communications, vol. Com-32, No. 3, Mar. 1984, pp. 315-319.

* cited by examiner

*Primary Examiner*—Shelly A Chase
(74) *Attorney, Agent, or Firm*—Allen, Dyer, Doppelt, Milbrath & Gilchrist, P.A.

(57) ABSTRACT

A communications system includes a transmitter having an encoder for encoding communications data and varying at least one of a puncturing of the code rate and a repetition rate on different portions of the communications data. As a result, a variable forward error correction is added to different portions of the communications data.

32 Claims, 4 Drawing Sheets

SYSTEM AND METHOD FOR VARIABLE FORWARD ERROR CORRECTION (FEC) PROTECTION

FIELD OF THE INVENTION

The present invention relates to communications apparatus and systems, and more particularly, this invention relates to forward error correction used in such apparatus and systems.

BACKGROUND OF THE INVENTION

An error correction and detection system is important in computer science and information systems, and especially applicable in communications systems because an error correction and detection system detects errors due to noise or other signal impairments that result during signal transmission. Error correction enables error localization and corrects errors.

In telecommunications, forward error correction (FEC) allows error control for data transmission, and differs from standard error detection and correction because the receiver can correct some errors without requesting a retransmission of data. The design of the code used in the FEC system determines the maximum fraction of errors that can be corrected in advance. As a result, different FEC codes can be suitable for different signal and transmission conditions.

In many error correcting and detection systems such as FEC, redundancy is added to transmitted information using a predetermined algorithm. Each of the redundant bits is a complex function of the original information bits. As a result, the encoded output may or may not include the original information. For example, unmodified inputs at the encoder output are systematic codes and those that are not are non-systematic.

FEC can be considered as an error system that averages the noise because each input data bit affects many transmitted symbols. Some symbols are more corrupted by noise than others and this allows the original data to be extracted from the other, less corrupted received signals that depend on the same user input data.

Block coding and convolutional coding are two major FEC systems used in many commercially available communications systems. Block codes use fixed-size blocks or packets of bits or symbols of predetermined size, while a convolutional code, on the other hand, works on bit and symbol streams of arbitrary length. Convolutional codes are usually decoded using the maximum likelihood sequence estimator algorithm, also known as the Viterbi algorithm or the Viterbi decoder.

In some applications, it is desirable to add different levels of protection to different portions of the data packet or transmission. For example, headers in a packet contain important data, often considered more important than the remaining data contained in the packet. In some cases, it is desirable if the headers can be received with higher reliability than the data or digital voice contained in the balance of the packet or transmission. The headers can contain destination data, identifiers, a cyclic redundancy check, and other bit information and data that is important to protect. Some prior art proposals encode/decode and interleave/deinterleave separately the headers, digital voice and data. This has some disadvantages since each FEC process for the separate data pieces requires flush bits and smaller interleavers.

SUMMARY OF THE INVENTION

In view of the foregoing background, it is therefore an object of the present invention to add variable FEC protection to data packets or transmissions that contain some data that could be considered more important than other data.

It is yet another object of the present invention to provide greater protection to headers contained in data packets versus the remaining digital voice or data.

A communications system includes an encoder, for example, a convolutional encoder for encoding communications data and varying at least one of a puncturing of the code rate and a repetition rate on different portions of the communications data. A variable forward error correction is added to different portions of the communications data.

The encoder can be part of a wireless transmitter or other transmitter, which includes a modulator that receives the communications data after encoding and typically an interleaver. A communications signal is formed for transmission. This communications signal is received at a receiver that includes a demodulator for demodulating the communications signal, a deinterleaver, and a decoder that decodes the communications data for further processing.

In one aspect, the modulator at the transmitter is operative for mapping the communications data into symbols based on a mapping algorithm to form a communications signal. The convolutional encoder could be operative for varying at least one of the puncturing of the code rate and repetition rate on communications data corresponding to a packet header. The convolutional encoder could be operative for encoding a portion of the packet header with a rate 1/n code and repeating again. The interleaver can interleave the encoded communications data and, in a non-limiting aspect of the present invention, only one, i.e., one common interleaver at the transmitter is required. The decoder at the receiver preferably is formed as a Viterbi decoder.

A method aspect is also set forth.

An encoder apparatus includes a convolutional encoder module that convolutionally encodes communications data. A code puncturing/repetition module varies at least one of a puncturing of the code rate and a repetition rate on different portions of the communications data. A variable forward error correction is added to different portions of the communications data. The code puncturing/repetition module varies at least one of the puncturing of the code rate and repetition rate on data corresponding to a packet header in one non-limiting example. The code puncturing/repetition module can encode a portion of the data corresponding to a packet header with a rate 1/n code and repeat again.

The different segments can then be interleaved in their entirety thereby obtaining variable levels of FEC protection on different segments of the transmission. This can give improved performance because of greater interleaving based time diversity throughout.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In accordance with a non-limiting example of the present invention, variable FEC protection can be added to data packets that contain some data that is more important than other data, for example, the header data versus digital voice or other data contained in the remaining portion of the data packet. Instead of treating each portion of data differently as implemented in some prior art systems, it is possible to vary at least one of the puncturing and repetition rate used on different pieces of data, using the same convolutional encoder and interleaver. This permits a larger interleaver for all data, which is an advantage on multipath/fading channels. It is also possible to use flush data bits only once at the end.

Punctured convolutional codes are explained in detail in the article entitled "High-Rate Punctured Convolutional Codes for Soft Decision Viterbi Decoding" by Yasuda, Kashiki, and Hirata, IEEE Transactions on Communications, Vol. 1 com-32, No. 3, March 1984, the disclosure which is hereby incorporated by reference in its entirety.

The system, apparatus and associated method can be used in networking applications where header information is embedded in the same packet with data, but is more important than the data. For example, in digital voice applications, the digital voice can have a bit error rate (BER) of about $10^{-2}$ If the header has a single bit in error, the packet would be discarded, which is inefficient. In accordance with non-limiting examples of the present invention, the system, apparatus and method would allow for a rate 4/5 code on the digital voice and a rate 1/2 or 1/4 on the header using the same convolutional encoder and interleaver, allowing the spreading of all data across time better as a non-limiting example. Different 1/n or other code rates could be used for different purposes, depending on the goals of those skilled in the art. It would also allow for common flush bits, and allow for the same encoder at the transmitter and the same decoder on the receiver.

Figure 1:
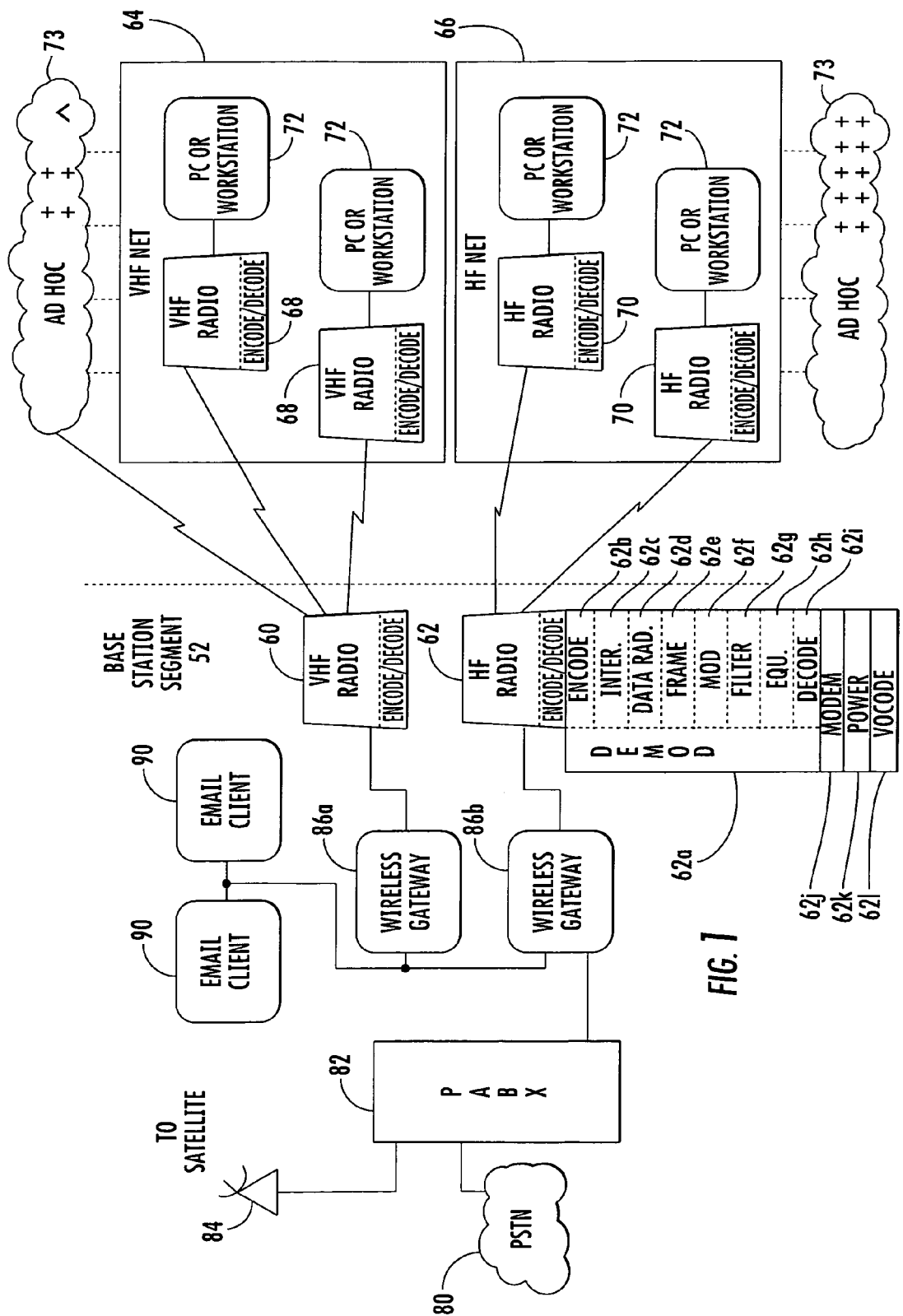
FIG. 1 is a block diagram of an example of a communications system that can be used in accordance with a non-limiting example of the present invention.

An example of a communications system that can be used with the present invention is now set forth with regard to FIG. 1.

An example of a radio that could be used with such system and method is a Falcon™ III radio manufactured and sold by Harris Corporation of Melbourne, Fla. It should be understood that different radios can be used, including software defined radios that can be implemented with relatively standard processor and hardware components.

For purposes of understanding, a brief description of an example of a communications system that would benefit from the present invention is described relative to a non-limiting example shown in FIG. 1. This high level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68, 70. Ad-hoc communication networks 73 are interoperative with the various components as illustrated. Thus, it should be understood that the HF or VHF networks include HF and VHF net segments that are infrastructure-less and operative as the ad-hoc communications network. Although UHF radios and net segments are not illustrated, these could also be included.

The HF radio can include a demodulator circuit 62a and appropriate convolutional encoder circuit 62b, block interleaver 62c, data randomizer circuit 62d, data and framing circuit 62e, modulation circuit 62f, matched filter circuit 62g, block or symbol equalizer circuit 62h with an appropriate clamping device, deinterleaver and decoder circuit 62i modem 62j, and power adaptation circuit 62k as non-limiting examples. A vocoder circuit 62l can incorporate the decode and encode functions and a conversion unit which could be a combination of the various circuits as described or a separate circuit. These and other circuits operate to perform any functions necessary for the present invention, as well as other functions suggested by those skilled in the art. Other illustrated radios, including all VHF mobile radios and transmitting and receiving stations can have similar functional circuits.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86a, 86b. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and Automatic Repeat Request (ARQ) functions.

Figure 2:
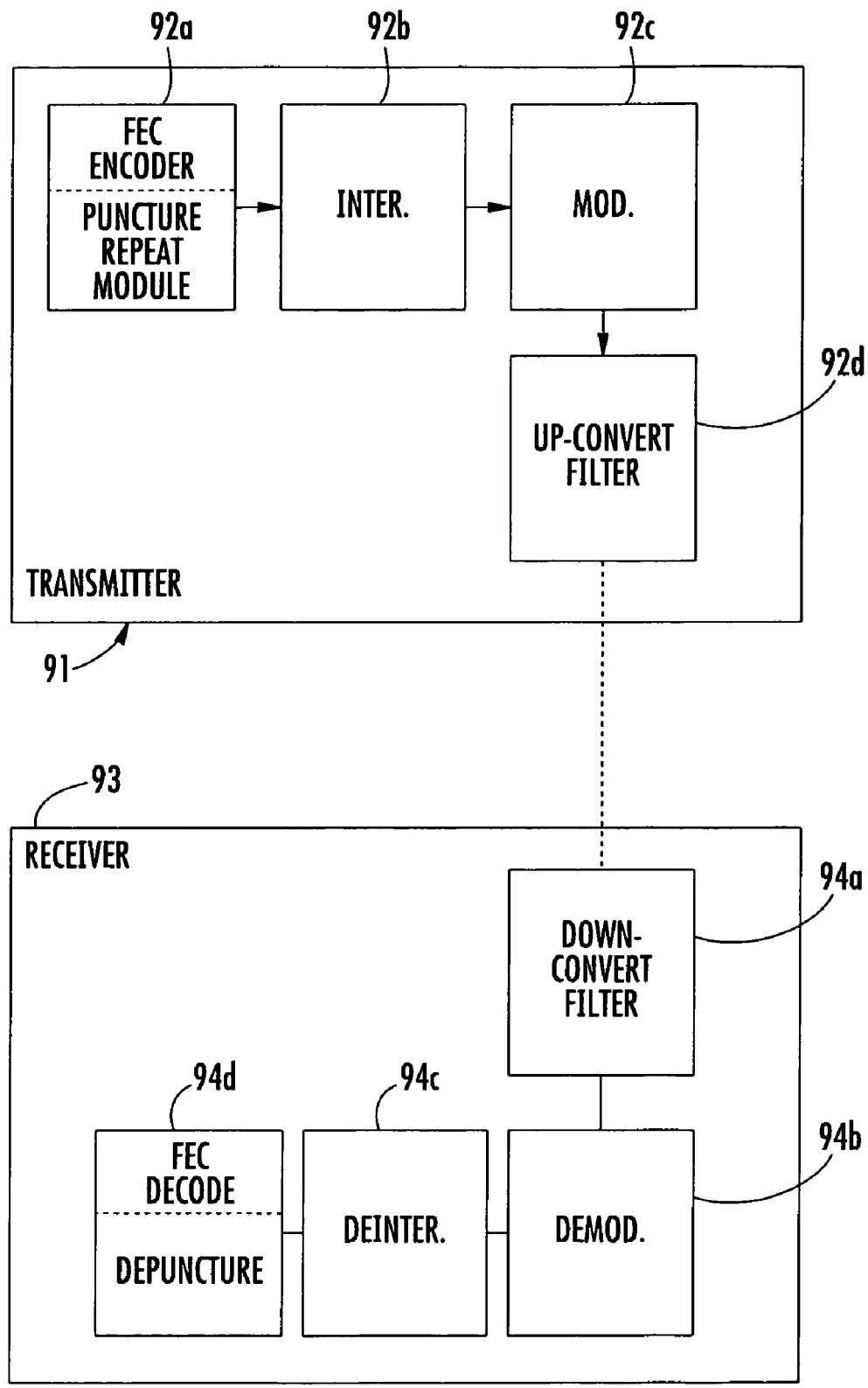
FIG. 2 is a high-level block diagram showing basic components that can be used in accordance with a non-limiting example of the present invention.

A communications system that can be used in accordance with non-limiting examples of the present invention is shown in FIG. 2. A transmitter is shown at 91 and includes basic functional circuit components or modules, including a forward error correction encoder 92a that includes a puncturing module, which could be integral to the encoder or a separate module. The decoder 92a and its puncturing module includes a function for repeating as will be explained below. Encoded data is interleaved at an interleaver 92b, for example, a block interleaver, and in many cases modulated at modulator 92c. This modulator can map the communications data into different symbols based on a specific mapping algorithm to form a communications signal. For example, it could form Minimum Shift Keying or Gaussian Minimum Shift Keying (MSK or GMSK) symbols. Other types of modulation could be used in accordance with non-limiting examples of the present invention. Up-conversion and filtering occurs at an up-converter and filter 92d, which could be formed as an integrated module or separate modules. Communications signals are transmitted, for example, wirelessly to receiver 93.

At the receiver 93, down conversion and filtering occurs at a down converter and filter 94a, which could be integrated or separate modules. The signal is demodulated at demodulator 94b and deinterleaved at deinterleaver 94c. The deinterleaved data (i.e. bit soft decisions) is decoded and depunctured (for punctured codes), combined (for repeated codes) and passed through (for standard codes) at decoder 94d, which could include a separate or integrated depuncturing module. The system, apparatus and method can use different modules and different functions. These components as described could typically be contained within one transceiver.

It should be understood, in one non-limiting aspect of the present invention, a rate 1/2, K=7 convolutional code can be used as an industry standard code for forward error correction (FEC) during encoding. For purposes of understanding, a more detailed description of basic components now follows. A convolutional code is an error-correcting code, and usually has three parameters (n, k, m) with n equal to the number of output bits, k equal to the number of input bits, and m equal to the number of memory registers, in one non-limiting example. The quantity k/n could be called the code rate with this definition and is a measure of the efficiency of the code. K and n parameters can range from 1 to 8, m can range from 2 to 10, and the code rate can range from 1/8 to 7/8 in non-limiting examples. Sometimes convolutional code chips are specified by parameters (n, k, L) with L equal to the constraint length of the code as L=k (m−1). Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate 1/2 code is used, the transmission of a subset of the output bits of the encoder can convert the rate 1/2 code into a rate 2/3 code. Thus, one hardware circuit or module can produce codes of different rates. Punctured codes allow rates to be changed dynamically through software or hardware depending on channel conditions, such as rain or other channel impairing conditions.

An encoder for a convolutional code typically uses a look-up table for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, also referred to as Viterbi decoding, which typically is more desirable. Sequential decoding allows both forward and backward movement through the trellis. Viterbi decoding as maximum likelihood decoding examines a receive sequence of given length, computes a metric for each path, and makes a decision based on the metric.

Puncturing convolutional codes is a common practice in some systems and is used in accordance with non-limiting examples of the present invention. It should be understood that in some examples a punctured convolutional code is a higher rate code obtained by the periodic elimination of specific code bits from the output of a low rate encoder. Punctured convolutional code performance can be degraded compared with original codes, but typically the coding rate increases.

Some of the basic components that could be used as non-limiting examples of the present invention include a transmitter that incorporates a convolutional encoder, which encodes a sequence of binary input vectors to produce the sequence of binary output vectors and can be defined using a trellis structure. An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio transceiver as described above. For example if the constraint length of the convolutional code is 7, the encoder and Viterbi decoder could support selectable code rates of 1/2, 2/3, 3/4, 4/5, 5/6, 6/7, 7/8 using industry standard puncturing algorithms.

Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate 1/2 code.

The Viterbi decoder parameters could include the convolutional code rate as a ratio of input to output bits for the convolutional encoder. The puncture rate could be the ratio of input to output bits for the convolutional encoder using a puncturing process and can be derived from a rate 1/2 mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle. Thus, the output bits could be defined by a combination of shift register elements using a standard generator code and be concatenated to form an encoded output sequence. There could be a serial or parallel byte data interface at the input. The output width could be programmable depending on the punctured code rate of the application.

A Viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

It should also be understood that the present invention is not limited to convolutional codes and similar FEC, but also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

Figure 3:
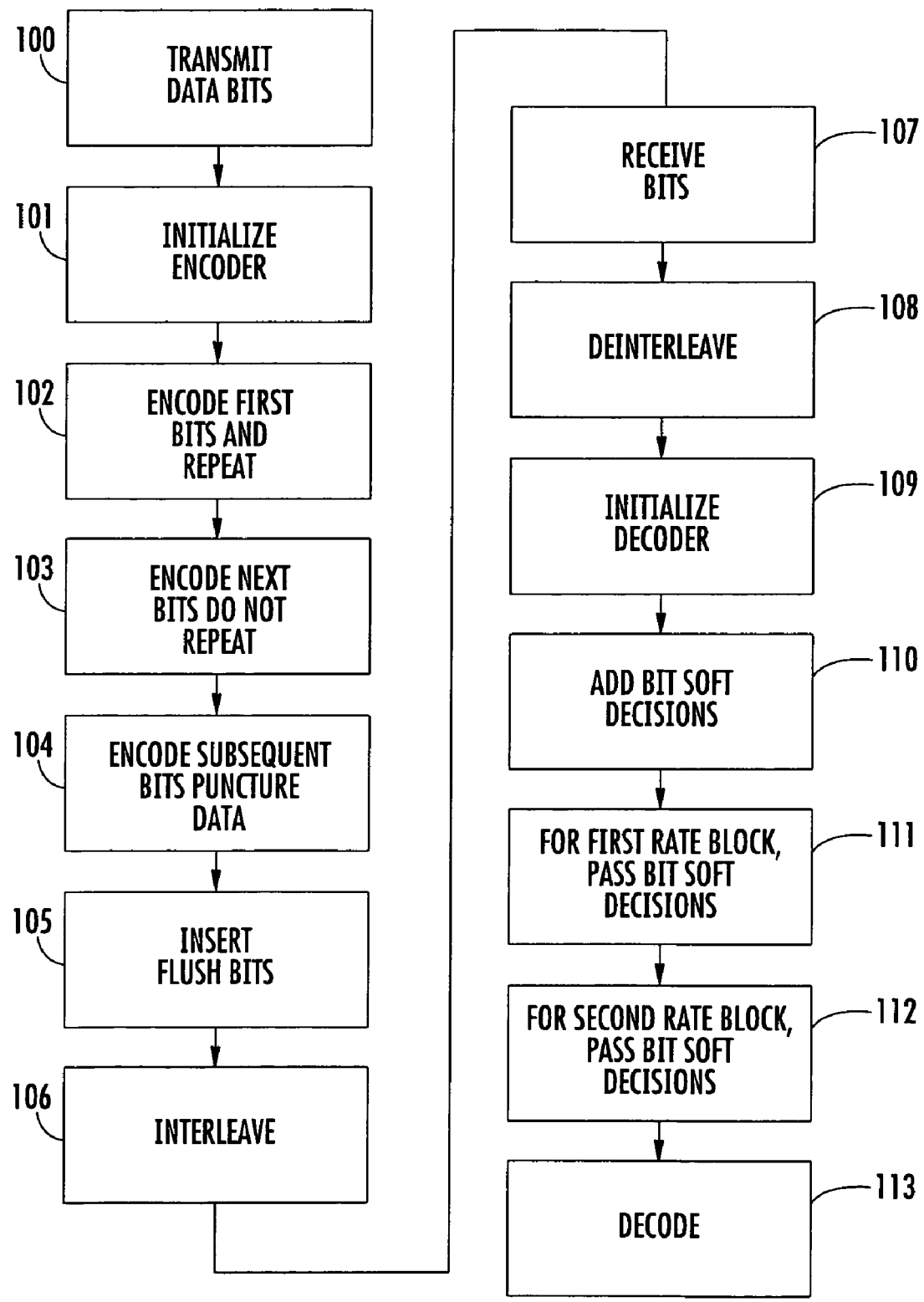
FIG. 3 a high-level flowchart illustrating various steps describing the flow of the invention in accordance with a non-limiting example of the present invention.

Referring now to FIG. 3, there is shown a high-level flowchart illustrating an example of the flow of the system, apparatus and method used for variable forward error correction (FEC) in accordance with non-limiting examples of the present invention. Data bits are transmitted (block 100). An encoder is initialized (block 101). The first bits are encoded and the process repeated (block 102). The next bits are encoded, but not repeated (block 103). Subsequent bits are encoded and data punctured (block 104). Flush bits are inserted (block 105). The data is interleaved (block 106). A receiver receives the bits (block 107). Deinterleaving occurs (block 108) and the decoder initialized (block 109). Bit soft decisions are added (block 110). Bit soft decisions are passed for the first rate block (block 111). Bit soft decisions are passed for the second rate block (block 112). Decoding occurs (block 113).

Figure 4:
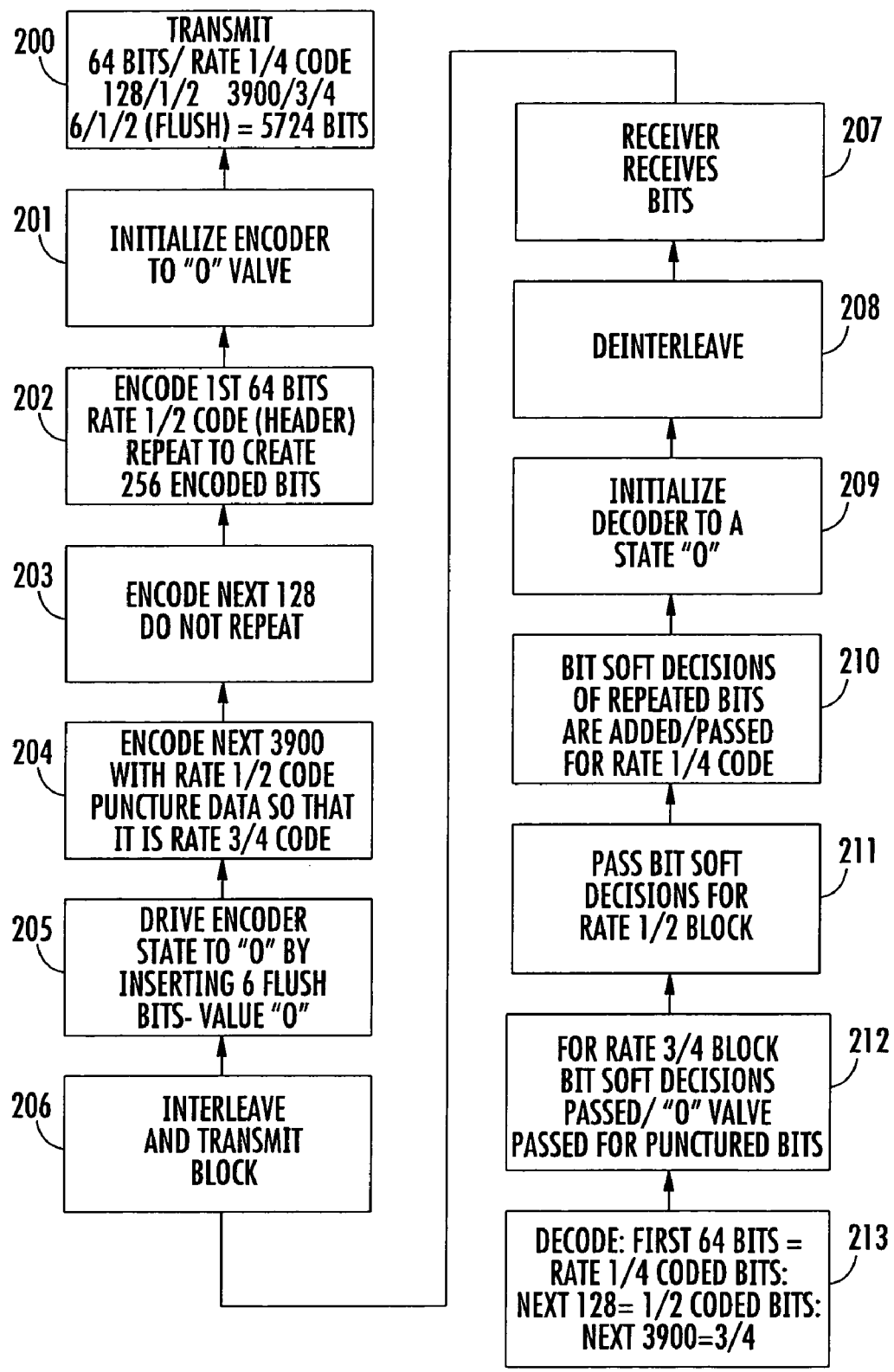
FIG. 4 is a more detailed flowchart similar to FIG. 3, but showing added details for the code rate and number of bits to be encoded.

Referring now to FIG. 4, there is shown a more detailed flowchart illustrating an example of the flow of the system, apparatus and method used for variable forward error correction (FEC) in accordance with non-limiting examples of the present invention, but showing further details of the code rates and number of bits. In this example, for clarity, reference numerals begin in the 100 series.

A data stream is transmitted (block 200) and could include in this non-limiting example 64 bits sent with a rate 1/4 code, 128 bits sent with a rate 1/2 code, 3,900 bits sent with a rate 3/4 code, and six bits sent with a rate of 1/2 code, as flush bits. The total transmitted block size is (64×4), plus (128×2), plus (3,900×4/3), plus (6×2) equals 5,724 bits. The encoder may use a rate 1/2, k=7 convolutional code as an industry standard code.

The encoder state could be initialized to a "0" value (block 201). The first 64 bits (corresponding to a header, for example) could be encoded with a rate 1/2 code. The encoder output is repeated twice, creating 256 encoded bits that are written to a transmit data array (tx_data_array) (block 202). The next 128 bits are encoded. This encoded data is not repeated twice, and the output of the encoder can be written to a transmit data array (tx_data_array) (block 203). The next 3,900 bits are encoded using a rate 1/2 code, but the data is punctured so that it is a rate 3/4 code instead of a rate 1/2 code and the punctured data is written to a transmit data array (tx_data_array) (block 204). Six flush bits of value "0" are inserted to drive the encoder state to zero. The output of the encoder is written to a transmit data array (tx_data_array) (block 205). When all transmit data is in the tx_data_array, the entire block of data is interleaved and transmitted (block 206).

A receiver receives the bits (block 207) and deinterleaves (block 208). The decoder is initialized to a state 0 (block 209). For a rate 1/4 block, bit soft decisions of repeated bits are added appropriately and passed to a decoder (block 210). For a rate 1/2 block, bit soft decisions are passed through to decoder (block 211). For a rate 3/4 block, bit soft decisions are passed to the decoder and a "0" value bit soft decision is passed to decoder for the bits that were punctured and deleted prior to transmission (block 212). As the data is decoded, the first valid 64 bits will be the rate 1/4 coded bits. The next 128 bits will be the rate 1/2 coded bits, and the next 3,900 coded bits will be the rate 3/4 bits (block 213). The rates, data, and repeating could vary, of course, for any packet depending on the goals of those skilled in the art.

To improve performance, it is possible to add transition regions between the blocks where the code rate can be changed. This is optional and may not be necessary to protect further the lower rate coded bits, for example, the rate 1/4 and 1/2 coded bits. Decoding could be accomplished in a streaming fashion with a decoder output of one bit per call. It is also possible to only update the trellis structure of the Viterbi decoder as soft decisions are passed to it. Then, at the end, the data bits can be pulled out.

The advantages of the system apparatus and method as described include different code rates that could be combined into a single, larger interleaver resulting in a variable forward error correction (FEC) system. Only one set of flush bits as explained at block 105 are required. A single decoder is all that is required to decode the different coded blocks and there is no resetting of the decoder function required as code rates are changed. This approach lends itself naturally to iterative equalization and decoding on multipath/fading channels. For example, in iterative equalization and decoding, the variable FEC scheme could be decoded, the data re-encoded and used to assist an equalizer on a second pass through the received data. This process could be repeated (iterated) several times.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system, comprising:
   an encoder for encoding communications data having a header and varying one of a puncturing of the code rate and a repetition rate on the header, wherein a variable forward error correction is added to different portions of the communications data; and
   an interleaver for interleaving all or part of the communications data after encoding.

2. A communications system according to claim 1, wherein said encoder is operative for encoding communications data with a Forward Error Correction (FEC) code comprising a convolutional code, a turbo-code or other FEC code that can be punctured.

3. A communications system according to claim 1, wherein said encoder is operative for varying one of at least the puncturing of the code rate and repetition rate on communications data corresponding to a packet header.

4. A communications system according to claim 3, wherein said encoder is operative for encoding a portion of the packet header with a rate 1/n code and repeating again.

5. A communications system according to claim 1, wherein said encoder is operative for inserting flush bits for communications data that are encoded at different rates.

6. A communications system, comprising:
a transmitter comprising,
   a convolutional encoder for encoding communications data having a header and varying at least one of a puncturing of the code rate and a repetition rate on the header, wherein a variable forward error correction is added to different portions of the communications data, and
   a modulator that receives the communications data after encoding and forms a communications signal for transmission; and
a receiver that receives the communications signal from the transmitter, and comprising,
   a demodulator that demodulates the communications signal, and
   a decoder that decodes the communications data for further processing.

7. A system according to claim 6, wherein said modulator at the transmitter is operative for mapping the communications data into symbols based on a mapping algorithm to form a communications signal.

8. A system according to claim 6, wherein said convolutional encoder is operative for varying at least one of the puncturing of the code rate and repetition rate on communications data corresponding to a packet header.

9. A system according to claim 8, wherein said convolutional encoder is operative for encoding a portion of the packet header with a rate 1/n code and repeating again.

10. A system according to claim 6, and further comprising an interleaver at the transmitter for interleaving the encoded communications data.

11. A system according to claim 6, wherein said decoder at said receiver comprises a Viterbi decoder.

12. A method for communicating data, which comprises:
encoding communications data having a header using an encoder; and
varying one of at least a puncturing of the code rate and a repetition rate on the header, wherein a variable forward error correction is added to different portions of the communications data.

13. A method according to claim 12, and further comprising encoding communications data with a Forward Error Correction (FEC) code comprising a convolutional code, turbo-code, or other FEC code that can be punctured.

14. A method according to claim 12, which further comprises varying at least one of the puncturing of the code rate and repetition rate on communications data corresponding to a packet header.

15. A method according to claim 14, which further comprises encoding a portion of the communications data corresponding to a packet header with a rate 1/n code and repeating again.

16. A method according to claim 12, which further comprises inserting flush bits for all communications data that are encoded at different rates.

17. A method according to claim 12, which further comprises decoding the communications data using a Viterbi decoder.

18. A method for communicating data, which comprises:
processing communications data having a header at a transmitter by convolutionally encoding the communications data while varying one of at least a puncturing of the code rate and a repetition rate on the header, wherein a variable forward error correction is added to different portions of the data;
modulating the communications data;
transmitting the communications data;
receiving the communications data within a receiver;
demodulating the communications data; and
decoding the communications data for further processing.

19. A method according to claim 18, which further comprises varying at least one of the puncturing of the code rate and repetition rate on communications data corresponding to a packet header.

20. A method according to claim 19, which further comprises encoding a portion of the communications data corresponding to a packet header with a rate 1/n code and repeating again.

21. A method according to claim 18, which further comprises inserting flush bits for all communications data that are encoded at different rates.

22. A method according to claim 18, which further comprises interleaving the communications data after encoding the communications data using a single interleaver.

23. A method according to claim 18, which further comprises decoding the communications data at the receiver using a Viterbi decoder.

24. An encoder apparatus, comprising:
a convolutional encoder module that convolutionally encodes communications data having a header; and
a code puncturing module that varies at least one of a puncturing of the code rate and a repetition rate on the header, wherein a variable forward error correction is added to different portions of the communications data.

25. An encoder apparatus according to claim 24, wherein said code puncturing module varies at least one of the puncturing of the code rate and repetition rate on data corresponding to a packet header.

26. An encoder apparatus according to claim 25, wherein said code puncturing module encodes a portion of the data corresponding to a packet header with a rate 1/n code and repeats again.

27. An encoder apparatus according to claim 24, and further comprising a single interleaver that interleaves communications data after encoding.

28. A communications system, comprising:
an encoder for encoding communications data and varying one of a puncturing of the code rate and a repetition rate on different portions of the communications data corresponding to a packet header, wherein a variable forward error correction is added to different portions of the communications data; and
an interleaver for interleaving all or part of the communications data after encoding.

29. A communications system, comprising:
an encoder for encoding communications data and varying one of a puncturing of the code rate and a repetition rate on different portions of the communications data and inserting flush bits for communications data that are encoded at different rates, wherein a variable forward error correction is added to different portions of the communications data; and
an interleaver for interleaving all or part of the communications data after encoding.

30. A method for communicating data, which comprises:
encoding communications data using an encoder; and
varying one of at least a puncturing of the code rate and a repetition rate on different portions of the communications data corresponding to a packet header, wherein a variable forward error correction is added to different portions of the communications data.

31. A method for communicating data, which comprises:
encoding communications data using an encoder; and
varying one of at least a puncturing of the code rate and a repetition rate on different portions of the communications data while inserting flush bits for all communications data that are encoded at different rates, wherein a variable forward error correction is added to different portions of the communications data.

32. An encoder apparatus, comprising:
a convolutional encoder module that convolutionally encodes communications data; and
a code puncturing module that varies at least one of a puncturing of the code rate and a repetition rate on different portions of the communications data corresponding to a packet header, wherein a variable forward error correction is added to different portions of the communications data.

* * * * *